United States Patent

[11] 3,595,995

[72] Inventor Gilbert L. Hobrough
Vancouver, British Columbia, Canada

[21] Appl. No. 758,954
[22] Filed Sept. 11, 1968
[45] Patented July 27, 1971
[73] Assignee Itek Corporation
Lexington, Mass.

[54] AUTOMATIC STEREO INSTRUMENT FOR REGISTRATION OF SIMILAR STEREO PHOTOGRAPHS
12 Claims, 1 Drawing Fig.

[52] U.S. Cl. ... 178/6.8, 178/6.5, 250/220 SP, 356/2
[51] Int. Cl. ... H04n 9/54, G01c 11/18
[50] Field of Search ... 250/220 SP; 178/DIG. 3, 6.8, 6.5; 356/2, 172; 343/5 MM, 7 TA; 324/77 K

[56] References Cited

UNITED STATES PATENTS

| | | | |
|---|---|---|---|
| 2,989,890 | 6/1961 | Dressler | 343/5 MM |
| 2,679,636 | 5/1954 | Hillyer | 356/2 |
| 2,910,910 | 11/1959 | Rosenfeld | 356/2 |
| 3,267,286 | 8/1966 | Bailey | 356/2 |
| 3,372,615 | 3/1968 | Birnbaum | 250/220 SP |
| 3,459,886 | 8/1969 | Doundoulakis | 178/6.8 |

*Primary Examiner*—Robert L. Griffin
*Assistant Examiner*—Joseph A. Orsino, Jr.
*Attorneys*—Homer O. Blair, Robert L. Nathans and Lester S. Grodberg

ABSTRACT: This invention pertains to the art of photogrammetry and is concerned primarily with instruments that achieve the registration of similar stereo photographic images a automatically by electronic scanning means. In particular, the invention concerns the transformation of such images as required to achieve registration and provides an improved method of establishing the complex high order transformations necessary when correlating stereo photographs of rough terrain.

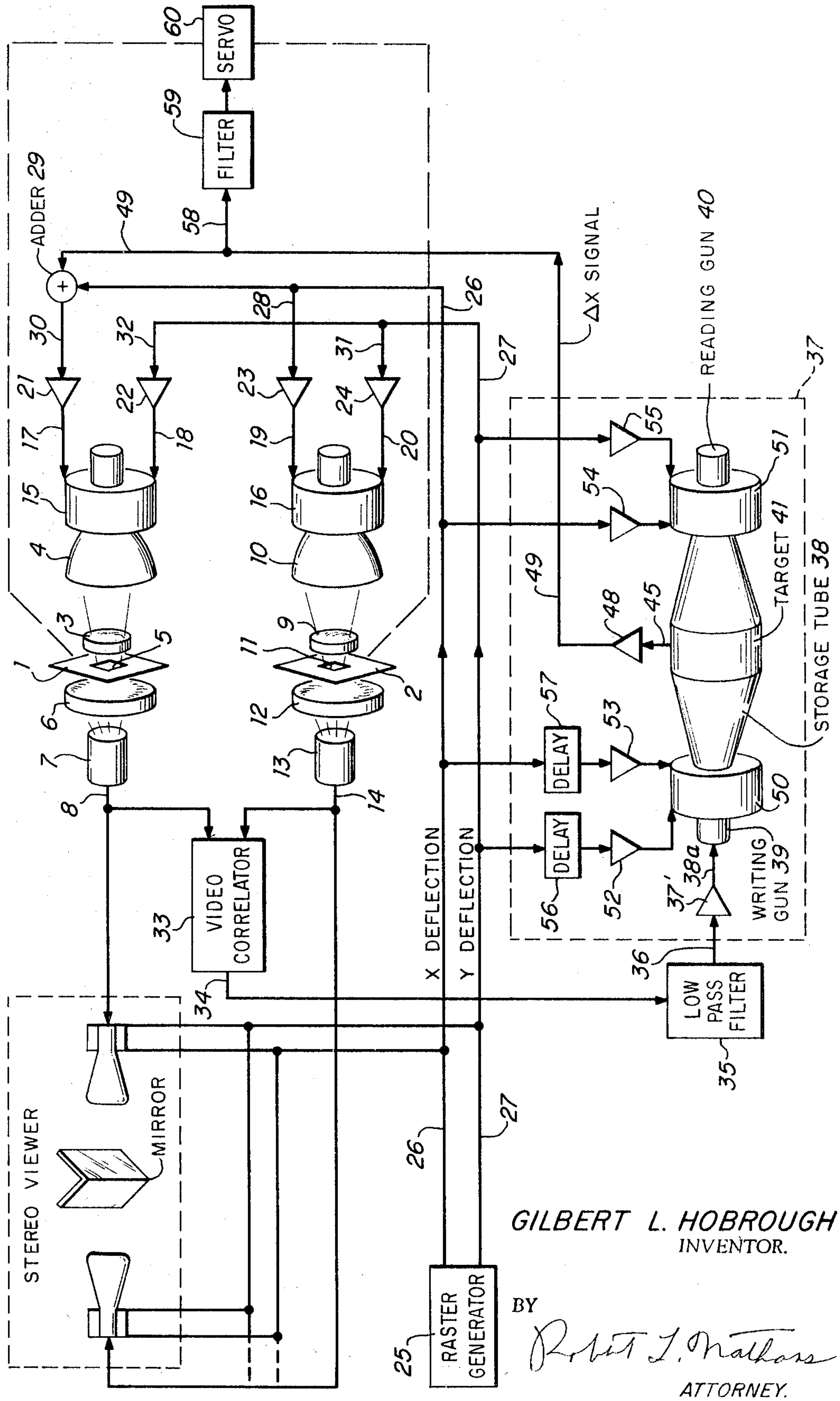
GILBERT L. HOBROUGH
INVENTOR.
BY Robert L. Nathans
ATTORNEY.

AUTOMATIC STEREO INSTRUMENT FOR REGISTRATION OF SIMILAR STEREO PHOTOGRAPHS

BACKGROUND OF THE INVENTION

The present invention pertains to the art of photogrammetry and is concerned primarily with the registration of similar stereophotographic images either for stereoscopic inspection thereof or for deriving terrain measurements therefrom. More particularly, similar stereophotographic images are scanned by electronic scanning means and circuitry is provided for transforming such images as required to achieve registration, including effecting of complex high order transformations.

In copending U.S. Pat. application Ser. No. 394,502 filed Sept. 4, 1964, for PHOTOGRAPHIC IMAGE REGISTRATION, now U.S. Pat. No. 3,432,674, issued Mar. 11, 1969, and assigned to the same assignee as the present invention an automatic registration viewer is disclosed consisting of separate closed TV systems for the left and right stereo channels. Video signals representing the scanned images associated with stereodiapositives are generated in the photomultiplier tubes of each scanner and are applied after amplification to associated cathode-ray tubes in the viewer. Analyzer and transformation circuits detect distortions in the images being scanned and automatically shift and transform the shapes of the scanning rasters until only relief parallaxes are detectable in the stereo viewer. This system is designed to accommodate stereophotographs of nearly unrestricted origin, e.g. panoramic stereographs or oblique stereographs.

A system generally similar to the foregoing but differing in the approach to correlation is disclosed in U.S. Pat. application Ser. No. 609,662 filed Jan. 16, 1967, for IMAGE TRANSFORMATION BY REVERBERATORY INTEGRATION and assigned to the same assignee as the present invention.

These patent applications contain a great deal of information regarding scanning, correlation and transformation techniques and apparatus and accordingly this information is not set forth in great detail in the present application since the aforesaid applications are incorporated by reference herein. Accordingly, for details regarding the types of distortions which are to be eliminated together with details of various circuitry or components set forth hereinafter, such as the video correlator, scanners, and stereo viewer, reference should be made to the aforesaid pending patent applications.

The improvement of the present invention is thought to have certain advantages over the systems disclosed in the aforesaid copending patent applications as will be set forth hereinafter.

SUMMARY OF AN EMBODIMENT OF THE INVENTION

In accordance with an embodiment of the invention a pair of stereodiapositives are scanned by conventional TV raster scanners. A first photocell optically coupled to the first stereodiapositive supplies a first video signal to a video correlator. In like manner a second photocell optically coupled to a second stereodiapositive produces a second video signal which is applied to the video correlator. The output of the video correlator is a stream of pulses which indicate the extend and direction of positional displacements or X parallaxes of corresponding points sequentially scanned in each stereodiapositive. A two-dimensional storage device stores these serially produced parallax error signals at coordinate positions of the storage device corresponding to coordinate positions of the points scanned in each stereodiapositive. The storage device includes a storage tube having a two-dimensional target therein. A writing gun raster scans the target as the diapositives are scanned, and since the parallax error signals sequentially modulate the intensity of the writing gun electron beam, charges will be built up on the target proportional to the parallax error signals. Although the charges tend to become dissipated on the target they will be regenerated since scanning of selected areas on the diapositives is effected over and over again. In this manner random noise fluctuations will be smoothed and the correct parallax error for each corresponding point scanned will be built up in the target. In other words, a stream of parallax errors for each coordinate point is integrated at the target. Another important advantage of the invention is that it is possible to correct for high orders of distortion as well as lower orders up to the limit of resolution of the system. The storage tube may be read out by a reading gun which may also be made to scan the target in synchronism with the scanning operations of the aforementioned scanners, writing gun, and the cathode-ray tubes of the stereo viewer. The "delta X" parallax signals modify the X deflection signal applied to one of the scanners in a direction to tend to reduce the numerous X parallaxes until only relief parallaxes are detectable in the stereo viewer. If an X parallax error averaged over a scanned area or frame exists, a DC signal may be applied to a servo drive means to translate one diapositive with respect to another until the average X parallax is reduced or eliminated. The delta X signals may, if desired, be utilized for terrain-mapping purposes.

DESCRIPTION OF A SPECIFIC EMBODIMENT

The FIG. 1 is a functional block diagram showing the "-Gestalf" Integrator as used in the registration of a pair of aerial photographs.

The arrangement in FIG. 1 is simplified in that no provision for the correction of Y parallax is shown, and X parallax transformations are applied to one photograph only. Balanced transformation arrangements are set forth in the aforesaid patent applications. The scanning pattern employed in the present embodiment is a conventional TV raster. With this raster the detection of Y parallax is difficult, but since stereo images do not normally contain unsystematic y parallaxes, this limitation is not considered to be important. Scanning patterns other than the TV raster may be employed with Gestalt integration. With other patterns the analysis of the parallax signal into X and Y components, as in the system disclosed in my copending U.S. Pat. application Ser. No. 394,502, for PHOTOGRAPHIC IMAGE REGISTRATION, now U.S. Pat. No. 3,432,674, issued Mar. 11, 1969, is necessary. The registration of images subject to distortions in the X and Y directions, such as radar or slit camera imagery, may be accomplished by employing two Gestalt Integrators, one for X displacements, the other for y displacements.

Referring to FIG. 1, the stereophotographs 1 and 2 are shown being scanned by flying spot scanners. The lens 3 images the raster on the face of cathode-ray tube 4 upon stereophotograph 1, the reduced raster being shown at 5. Light passing through the photograph 1 is collected by the condenser lens 6 and directed toward the multiplier phototube 7, giving rise to a video signal on line 8 representing the imagery being scanned at 5. Similarly, lens 9 images the raster on the face of cathode-ray tube 10 upon the stereophotograph 2, the reduced raster being shown at 11. Light passing through the photograph is collected by the condenser lens 12 and directed toward the multiplier phototube 13, giving rise to a video signal on line 14 representing the imagery being scanned at 11. Cathode-ray tubes 4 and 10 are surrounded by deflection yokes 15 and 16 respectively, to deflect the electron beams in response to signals on lines 17, 18, 19 and 20, thereby causing the scanning spots to produce rasters on the faces of the cathode-ray tubes. The deflection amplifiers 21, 22, 23 and 24 drive the X and Y coils in the deflection yoke 15, and the X and Y coils in the deflection yoke 16, respectively. The deflection signals are derived from raster generator 25 which delivers on line 26 a sawtooth waveform of relatively high frequency to provide horizontal deflection, and on line 27 a sawtooth waveform of relatively low frequency to provide vertical deflection. The horizontal waveform on line 26 is delivered to deflection amplifier 23 via line 28 and to deflection amplifier 21 via adder 29 and line 30. Similarly, the vertical deflection waveform on line 27 is delivered to deflection amplifier 24 via line 31 and to deflection amplifier 22 via line 32.

Video signals generated in response to the scanning of photographs 1 and 2, and appearing on lines 8 and 14 respectively, are correlated together in the video correlator 33 to deliver an instantaneous parallax error signal on line 34. The video correlator 33 is similar to the correlator described in U.S. Pat. application Ser. No. 394,502. It may contain a number of channels, each dealing with a fraction of the video spectrum, and for this purpose band-pass filters would be included in the correlator for each video channel. The correlators would be of orthogonal type, that is they would contain phase shift or time delay networks so that the signal delivered on line 34 will be 0 whenever signals on lines 8 and 14 are of identical waveform and timing.

The instantaneous parallax signal on line 34 is delivered to the low-pass filter network 35, which removes unwanted high frequency noise signals from the instantaneous parallax signal. The resulting smoothed parallax signal on line 36 is delivered to the "Gestalt" Integrator to be described in the next paragraph.

Dashed lines 37 surround the components that together comprise the "Gestalt" Integrator which includes a scan-converter storage tube 38. The converter tube, which may be an RCA "Graphicon" tube, includes a writing gun 39, a reading gun 40, and target structure 41 which delivers an output signal on line 45. The smoothed X parallax signal on line 36 is delivered to a drive amplifier 37' which in turn delivers an amplified X parallax signal on line **38*a* to the intensity electrode of writing gun 39. The output signal from the scan converter tube on line 45 is delivered to preamplifier 48 which in turn delivers an amplified replica of the output signal on line 49 to the summing point or adder 29 and then to the deflection amplifier 21 and the X deflection coil of cathode-ray tube 4. The output signal on line 49** will be referred to hereafter as the delta X signal.

Both the writing and the reading sections of the scan-converter tube 38 are surrounded by deflection yokes 50 and 51 respectively, and the yokes are energized by deflection amplifiers 52, 53, 54 and 55. It will be seen that the horizontal and vertical waveforms from the raster generator 25 and available on lines 26 and 27 drive all the deflection amplifiers to establish identical TV rasters for both writing and reading the target. The delay circuits 56 and 57 cause the scanning beam in the writing section of the gun to lag slightly behind the beam in the reading section, and the delays are adjusted to equal the total delay in the video correlator 33 and the low-pass filter 35, to thereby store the delta X signals at their proper "XY" locations on the target.

The delta X signal on line 49 is delivered via line 58 to filter 59. After filtering, this DC signal which represents average X parallax error, may be used to drive corrective servosystem 60 that can reposition one or both of the photographs 1 and 2 via linkages 61 and 62. Under these conditions the output of the device would be the coordinates of the photograph subject to such servo adjustment.

It will be seen from FIG. 1 that the position of the scanning spot in cathode-ray tube 4 may be shifted with respect to its normal position in the scanning raster at any instant, by the delta X signal applied to adder 29 to modify the signal applied to X deflection amplifier 21. The delta X signal will, therefore, cause the raster on cathode-ray tube 4 to be deformed or velocity modulated with respect to the raster on the other cathode-ray tube, and the deformation will be simple or complex depending upon the waveform of the delta X signal. It will be seen also that the deformation of the raster in a particular area thereof will depend upon the X parallax information that has been sensed in that area and which becomes, after "-Gestalt" integration, the delta X signal.

Let us first consider that photographs 1 and 2 are identical in every respect and are accurately oriented with respect to the optical axes of both flying spot scanners. Under these conditions the video signals appearing on lines 8 and 14 will also be identical and the parallax signals from the video correlator appearing on 36 will be zero. Likewise the amplified signal delivered to the writing gun of the scan-conversion tube on line **38*a* will also be zero. The zero signal on line 38*a* implies that the electron beam from the writing gun 39 of the scan-conversion tube will be unmodulated and will store on the target a pattern of uniform intensity. After equilibrium has been reached in the target 41, the signal readout on line 45 will be zero, and the amplified delta X signal on line 49 will likewise be zero. It will be seen therefore that under these conditions, the scanning raster on the face of cathode-ray tube 4 will be unperturbed by deformations resulting from the delta X signal and will therefore be identical with the raster on cathode-ray tube 10**.

Let us assume next that the photographs 1 and 2 are a stereo pair covering terrain that is flat except for a small hill near the center of the scanned area. We will assume first that the scanning operation has just commenced and that the delta X signal is zero giving identical rasters on cathode-ray tubes 4 and 10. Throughout the scanning of the photographs the conditions described in the last paragraph will obtain except when the scanning spot is traversing the elevated area of the hill near the center of the raster. During the scanning of the hill, X parallax will be present owing to the relief displacement of the images, and the video signals on lines 8 and 14 will be displaced relatively in time. During the scanning of the hill, therefore, a brief, let us say positive, signal will appear on line 36 after amplification, on line **38*a* which is the input to the writing gun. The positive signal will increase the beam current of the writing gun 39 momentarily which in turn will cause a small change in the charge distribution on the target. Since the raster on the target of the scan-converter or storage tube 38 is scanned in synchronism with the rasters on the film scanners, the change in charge distribution arising out of the parallax signal on line 38*a*, will be positioned in the raster area at a point corresponding to the position of the hill in the scanned area of the photographs 1 and 2**. After the scanning of several complete frames, the charge distribution on the target will build up owing to the integrating action of the target.

Simultaneously with the writing of charge information representing relief in the photograph upon target 41, the pattern on the target is being interrogated by the reading electron beam produced by reading gun 40. As a result of the reading action, a signal is delivered on line 45, and in the case under consideration, a positive voltage will appear on line 45 whenever the reading beam traverses the area represented by the hill in the scanning area. It will be seen that the signal readout on line 45 and amplified on line 49 will build up gradually owing to the repeated writing of the information with each frame scanned. The signal on line 49 at any instant therefore represents the X parallax or altitude of a point in the raster being scanned at the corresponding instant, but representing a summation of a number of frames superimposed. It will be seen also that adjacent areas in the scanned raster may develop signals averaged in time, but independent of the signals existing in other adjacent areas. In summary, amplified output signal from scan-converter tube 38 and appearing on line 49 represents the parallax sensed by the correlator 33 and is called the delta X signal. As shown in the figure, this signal is added to the X deflection signal applied to the yoke 15 of cathode-ray tube 4. The action of the delta X signal is to shift this scanning spot in cathode-ray tube 4 in such a direction that the parallax sensed by the video correlator 33 will be reduced. It will be seen therefore that the action of the entire circuit is to modify the shape of the scanning raster on cathode-ray tube 4 by perterbations of the spot in the X direction, such that the parallaxes as sensed by the video correlator 33 are reduced. It will be seen also that this feedback system acts independently for different areas within the scanned raster and that the number of such independent areas will depend upon the resolution of the scan-converter tube 38.

The action described in the previous paragraph by the "-Gestalt" Integrator is one of averaging the parallax signal derived from the stereo photographs in time, in such a manner that elemental areas within the scanned raster are averaged separately. Area averaging is also possible by adjusting the resolution of the scan-converter tube 38 which in effect control the size of an elemental area in the target. The "Gestalt" Integrator therefore averages both in area and in time so that a parallax signal appearing on line 34 for the video correlator is smoothed by such averaging action and appears on line 49 as a coherent delta X signal. The averaging area can be adjusted continuously by varying the resolution of at least one of the electron beams in the scan-converter tube, while the averaging time can be adjusted by controlling the persistance or discharge rate of the target of the scan-converter tube.

Owing to the delay networks 56 and 57, the unavoidable signal delays occurring in the video and correlating circuits, do not introduce an error in the positioning of deformations within the scanning raster. It should be noted that the delta X signal at any instant is not derived from the frame being scanned, but from previous frames, owing to the decay time of the target; earlier frames contribute less than recent frames to the delta X signal at any instant.

It should be understood that the scanning means need not necessarily be flying spot scanners but could comprise other apparatus for optically scanning the diapositives such as a deflectable laser beam. Each particular X parallax error signal would probably be inserted into the same XY coordinate position of the storage means substantially corresponding to the XY position of its corresponding point on the diapositives. However, this need not necessarily be the case so long as some correlation exists between each storage position and each XY point position on the diapositives. For example, while the diapositives are scanned from top to bottom, the parallax error signals may be read into the storage device from bottom to top. It is thought that the storage tube disclosed hereinabove would be a highly desired type of storage device due to its high resolution. However, it is conceivable that other storage planes consisting of, for example, cores or photoelectrets may be utilized. If a core plane is utilized it should be apparent that distribution of the parallax error signals into the storage plane and readout therefrom could be effected by commutator matrices coupled to the deflection voltage raster generator via analog digital converters.

I claim:

1. In an automatic stereo instrument, the improvement comprising:

a. first means for scanning an area of a first stereophotograph and for producing a first plurality of signals representative of the scanned image thereon, and including a flying spot scanner which is driven by X and Y deflection circuitry;

b. second means for scanning an area of a second stereophotograph and for producing a second plurality of signals representative of the scanned image thereon, and including a flying spot scanner which is driven by X and Y deflection circuitry;

c. a raster generator, coupled to said X and Y deflection circuitry associated with the first and second scanning means, for applying raster scanning signals to said X and Y circuitry;

d. means for correlating said first and second plurality of signals and for producing a series of parallax error signals representing parallax differences between corresponding points on said first and second stereophotographs;

e. a storage device for storing said series of parallax error signals at storage positions associated therewith substantially corresponding to the coordinate locations of said corresponding points on said first and second stereophotographs;

f. means for coupling said raster generator to said storage device for causing said parallax error signals to be stored at positions associated with said storage device substantially corresponding to associated points on said stereophotographs;

g. readout means for sequentially reading out said parallax error signals stored within said storage device; and h. means for coupling said readout means to said raster generator.

2. The combination as set forth in claim 1 wherein said readout means is coupled to means for modifying the raster signal applied to at least one of said scanning means for reducing said parallax error signals.

3. The combination as set forth in claim 2 further including servo drive means coupled to at least one of said photographs for shifting the position of at least one of said photographs relative to the other of said photographs to reduce average X parallax; and means coupled between said readout means and said servo drive means for applying a DC signal to said servo drive means proportional to average X parallax.

4. In an automatic stereo instrument, the improvement comprising:

a. first means for scanning an area of a first stereophotograph and for producing a first plurality of signals representative of the scanned image thereon, and including a first scanner which is driven in X and Y to scan the first stereophotograph;

b. second means for scanning an area of a second stereophotograph and for producing a second plurality of signals representative of the scanned image thereon, and including a second scanner which is driven in X and Y to scan the second stereophotograph;

c. raster generator means, coupled to said first scanning means and said second scanning means, for driving said first and second scanners;

d. means for correlating said first and second plurality of signals and for producing a series of parallax error signals representing parallax differences between corresponding points on said first and second stereophotographs;

e. a storage device for storing said series of parallax error signals at storage positions associated therewith substantially corresponding to the coordinate locations of said corresponding points on said first and second stereophotographs;

f. means for coupling said raster generator to said storage device for causing said parallax error signals to be stored at positions associated with said storage device substantially corresponding to associated points on said stereophotographs; and, g. readout means for electrically reading out in sequence said parallax error signals stored within said storage device.

5. Apparatus as set forth in claim 4 wherein said stereo instrument further includes means for coupling said readout means to said raster generator means.

6. The combination as set forth in claim 4 wherein said storage device includes a two-dimensional array of numerous storage elements.

7. The combination as set forth in claim 4 wherein said storage device comprises a storage tube having a two-dimensional target associated therewith for storing charges having strengths proportional to said parallax error signals.

8. The combination as set forth in claim 1 further including servo drive means coupled to at least one of said photographs for shifting the position of at least one of said photographs relative to the other of said photographs to reduce average X parallax; and means coupled between said storage device and said servo drive means for applying a DC signal to said servo drive means proportional to average X parallax.

9. In an automatic stereo instrument the improvement comprising:

first means for scanning an area of a first stereophotograph and for producing a first video signal representative of the scanned image thereon;

second means for scanning an area of a second stereophotograph and for producing a second video signal representative of the scanned image thereon;

means for correlating said first and second signals and for producing a series of parallax error signals representing displacements between corresponding points on said first and second stereophotographs;

a two-dimensional storage device including a two-dimensional array of numerous storage elements for storing the series of parallax signals produced by said correlating means at coordinate storage positions associated therewith substantially corresponding to the coordinate locations of corresponding points on said first and second stereophotographs;

writing means associated with said storage device for sequentially writing in said parallax signals into said storage device;

readout means for sequentially reading out said parallax signals stored within said storage device;

a raster generator for applying X deflection and Y deflection control signals to said first and second scanning means, to said writing means and to said readout means; and modifying means coupled between at least one of said scanning means and said readout means for modifying said X deflection signal applied to at least one of said scanning means to reduce said X parallax signals associated with corresponding scanned points in said photographs.

10. The combination as set forth in claim 9 wherein said modifying means includes an adder circuit.

11. The combination as set forth in claim 9 further including servo drive means for shifting the relative X position of said stereo photographs in a direction to reduce overall X parallax; and means coupled between said readout means and said servo drive means for applying a control signal to said servo drive means proportional to average X parallax associated with the scanned areas of said photographs.

12. The combination as set forth in claim 11 wherein said last-named means includes a filter for producing a DC signal proportional to average X parallax.